United States Patent [19]

Inoue et al.

[11] Patent Number: 4,528,580
[45] Date of Patent: Jul. 9, 1985

[54] IMAGE INFORMATION RECORDING APPARATUS

[75] Inventors: Takahiro Inoue; Kazuhiro Hirayama, both of Yokohama; Masaharu Tsukada, Kawasaki, all of Japan

[73] Assignee: Canon Kabushiki Kaisha, Tokyo, Japan

[21] Appl. No.: 460,826

[22] Filed: Jan. 25, 1983

[30] Foreign Application Priority Data

Feb. 2, 1982 [JP] Japan .................................. 15212

[51] Int. Cl.³ .......................................... G01D 15/14
[52] U.S. Cl. .................................................. 346/160
[58] Field of Search ..................... 346/108, 76 L, 160; 358/300, 302

[56] References Cited

U.S. PATENT DOCUMENTS

| 4,197,560 | 4/1980 | Minerd ............................ 346/160 X |
| 4,373,063 | 2/1983 | Kitamura ....................... 346/76 L X |
| 4,375,067 | 2/1983 | Kitamura ............................ 346/160 |
| 4,383,755 | 5/1983 | Fedder et al. ................. 346/160 X |

Primary Examiner—Thomas H. Tarcza
Attorney, Agent, or Firm—Fitzpatrick, Cella, Harper & Scinto

[57] ABSTRACT

In an apparatus using a semiconductor laser to record image information, an optical filter for decreasing the difference between the rising peak value and the steady value of the intensity of a laser beam is disposed in the optical path of the laser beam in order to prevent any density difference attributable to the difference between the rising peak value and the steady value from being created in the image.

5 Claims, 4 Drawing Figures

IMAGE INFORMATION RECORDING APPARATUS

BACKGROUND OF THE INVENTION

1. Field of the Invention

This invention relates to an apparatus which uses a semiconductor laser to record image information.

2. Description of the Prior Art

In a semiconductor laser, the output quantity of light varies in accordance with the variation in temperature of the laser. It is therefore desirable to keep the temperature of the laser constant.

However, even if the temperature of the semiconductor laser is kept constant, there occurs a phenomenon that the output quantity of light varies with lapse of the turn-on time as shown in FIG. 1 of the accompanying drawings.

FIG. 1 is a graph in which the abscissa represents the turn-on time t and the ordinate represents the laser light output mW. As will be seen in FIG. 1, the output reaches a peak in about 10 nsec. after the initiation of power supply to the semiconductor laser, whereafter the output gradually lowers and reaches a steady value in about 100 μsec. This phenomenon will hereinafter be referred to as streaking by borrowing a term from the field of television art, and it is to be understood that the degree thereof is expressed as (b/a)×100 (%), where a is the steady output and b is the difference between the rising peak value of the output and the steady output.

The degree of streaking has great correlation with the laser power (output). Table 1 below shows the relation between the steady output of a gallium arsenic semiconductor laser, having maximum continuous output 5 mW and output wavelength 780 nm, and the degree of streaking.

TABLE 1

| Laser output (mW) | 0.5 | 1 | 2 | 3 | 4 | 5 |
|---|---|---|---|---|---|---|
| Degree of streaking (%) | 76 | 54 | 40 | 25 | 20 | 15 |

As shown in Table 1, if, for example, a semiconductor laser of maximum continuous output 5 mW is used at an output 0.5 mW, the steady output thereof will be about ¾ of the rising peak. If the streaking is great, the influence thereof will appear in the image.

For example, where a recording medium is scanned with the semiconductor laser remaining turned on, there is a problem that the image density differs between the point at which the scanning is started and the point at which the scanning is terminated or the density differs between vertical lines and horizontal lines.

The phenomenon of streaking as described above results from the heat resistance of the semiconductor laser itself and cannot be corrected by external temperature control means.

As a method for eliminating the adverse effect of the phenomenon of streaking, an image bearing member may be scanned by a laser light having a sufficient quantity of light so that the image density does not vary even if the laser output fluctuates. However, the intensity distribution of the laser light assumes a gauss distribution and therefore, if an intense light is imparted thereto, there will arise another problem that the spot size of the laser light on the surface of the recording medium becomes larger and sharpness is lost in the image obtained.

This will hereinafter be described by reference to FIG. 2 of the accompanying drawings. In FIG. 2, a first quadrant shows the E-V curve of an electrophotographic photosensitive member, namely, the relation between the exposure amount E of the electrophotographic photosensitive member and the latent image potential V created thereby. A fourth quadrant shows the relation between the exposure amount E and the current intensity I of the laser light. A third quadrant shows the intensity distribution of one spot of the laser light and also shows the relation between the position x and the intensity I of the laser light.

An electrostatic latent image created by one spot of the laser light from the relation among the first, fourth and third quadrants is shown in a second quadrant.

In the area $C_1$ of the E-V curve, the photosensitive member is in a high potential state and, even if the exposure amount E varies, the potential V hardly varies or the amount of variation thereof is very small. In the area $C_3$, the photosensitive member is in a low potential state and, even if the exposure amount E varies, the potential V hardly varies or the amount of variation thereof is very small. The area $C_1$ will hereinafter be referred to as the highland area, and the area $C_3$ will hereinafter be referred to as the lowland area. In the area $C_2$ which interconnects the areas $C_1$ and $C_3$, the curve is steep and the amount of variation in potential V for the variation in exposure amount E is great. This area $C_2$ will hereinafter be referred to as the steeply sloped area.

In any case, if the photosensitive member is exposed to light in the lowland area $C_3$ of E-V curve (beam intensity $I_1$, exposure amount $E_1$), the image density will hardly vary even if the phenomenon of streaking occurs in the output of the semiconductor laser. However, the intensity distribution of a beam spot of intensity $I_1$ is as indicated by $S_1$, and the potential distribution of the latent image formed by this beam spot is as indicated by $L_1$. As will be seen from this curve $L_1$, the size of one spot becomes large and the resolving characteristic is reduced.

SUMMARY OF THE INVENTION

It is an object of the present invention to solve the above-noted inconveniences.

It is another object of the present invention to provide an apparatus which can reduce the influence of the phenomenon of streaking of a semiconductor laser upon the image and can form images of good resolving characteristic.

It is still another object of the present invention to provide an apparatus of simple construction which can reduce the influence of the phenomenon of streaking of a semiconductor laser upon the image.

Other objects and features of the present invention will become apparent from the following detailed description taken in conjunction with the accompanying drawings.

DESCRIPTION OF THE PREFERRED EMBODIMENTS

Figure 3:
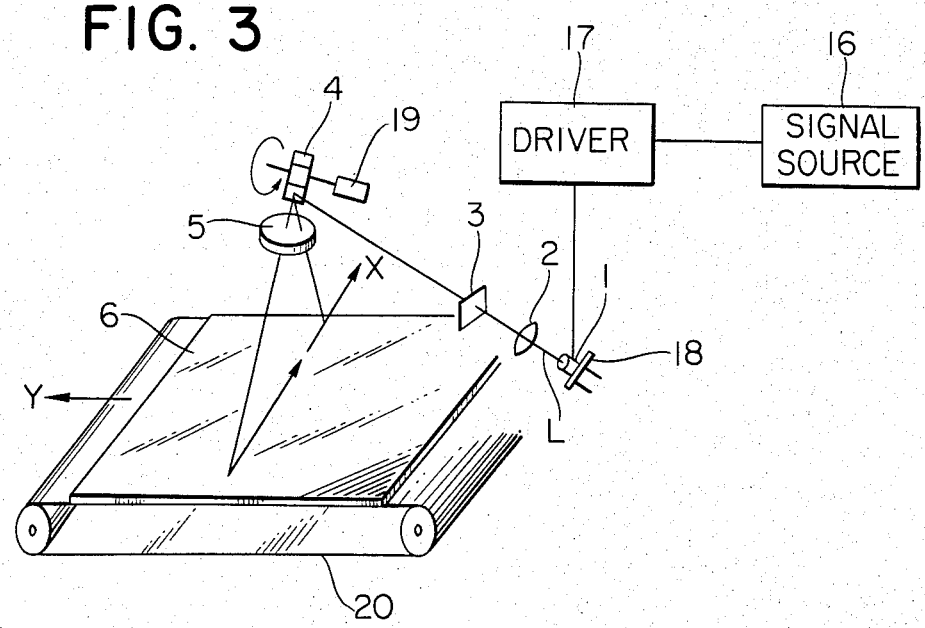
FIG. 3 illustrates an embodiment of the present invention.

In FIG. 3, a semiconductor laser 1 is kept at a substantially constant temperature by a temperature control means 18 such as a Peltier element. A laser driver 17 controlled by an image signal (an electrical signal corresponding to an image to be recorded) formed by a signal source (e.g. a computer or the like) 16, causes a current to flow to the semiconductor laser 1 that corresponds to the image signal. The image signal is a signal which is time-serially intermittent, and the semiconductor laser 1 intermittently oscillates and puts out a laser light L correspondingly to that signal. The light L emitted from the semiconductor laser 1 diverges at a certain angle and therefore, it is made into a parallel light beam by a collimater lens 2. The light is then passed through a filter 3 such as an ND (neutral density) filter or a color filter, whereby the intensity of the light is attenuated. Subsequently, by scanning means 4 such as a polygonal mirror rotatively driven by a motor 19 or a hologram, the laser light L is caused to scan a recording medium 6 in the major scanning direction X and the scanning light is focused in the form of a spot on the surface of the recording medium 6 by a focusing lens 5 such as f-$\theta$ lens. The recording medium 6 is a silver salt photosensitive medium such as printing paper or dry silver, or an electrophotographic photosensitive medium such as ZnO, CdS, amorphous Se or amorphous Si. This recording medium 6 is moved at a predetermined constant speed by a conveyor belt 20 or the like in the minor scanning direction Y substantially orthogonal to the major scanning direction X of the laser light. Thus, by the major scanning deflection of the laser light and the minor scanning movement of the recording medium 6, the surface of the recording medium 6 is generally scanned by the laser light modulated in accordance with the image signal, whereby an image pattern corresponding to the image signal relative to the laser 1 is directly recorded as a visible image or as a chemical, electrical or magnetic latent image on the surface of the recording medium 6. In case of a visible image, it will thereafter be subjected to a fixation process if required, and in case of a latent image, it will thereafter be visualized by suitable means.

The optical filter 3 makes the difference b between the rising peak value and the steady value of the semiconductor laser 1 small. Therefore, the difference between the amount of exposure of the recording medium when the output of the semiconductor laser is steady and the amount of exposure of the recording medium when the output of the semiconductor laser is at its rising peak can be made small and the difference between the image density during said steady state and the image density during said rising peak can be substantially eliminated or kept in an allowable range. The output of the semiconductor laser 1 is set so that, during said steady state, the amount of exposure of the recording medium by the laser light passed through the filter 3 is an amount of exposure which enables an image of proper density to be formed. It is also preferable to set the output of the semiconductor laser to such an output that the degree of streaking is as small as possible. For example, in the semiconductor laser mentioned in Table 1, the steady output may be selected within the range of 3-5 mW. In other words, it is preferable that the driver 17 apply to the semiconductor laser 1 a current of such a value that the steady output thereof is 3-5 mW.

On the other hand, the filter 3 should preferably be an ND filter having no wavelength selection characteristic, but may be a color filter if it has an absorption characteristic for the wavelength of the output light of the semiconductor laser. The material of the filter may be glass, acetate, gelatin or the like.

It is also possible to divide the sensitivity of the recording medium into several groups, prepare filters corresponding to the respective groups and interchange the filter in conformity with the sensitivity.

Where it is desired to record a reduced image, it is common to slow down the speed of the motor 19 and thereby delay the scanning speed of the scanning means 4 and to slow down the movement speed of a belt 20 and thereby delay the feeding speed of the recording medium 6. In such case, the transmission factor of the filter 3 may be changed to a value smaller than that during one-to-one magnification image recording to render the amount of exposure of the recording medium the same as that during one-to-one magnification image recording. As a specific example of the construction, several types of filters 3 having various transmission factors may be arranged in the form of a turret and a filter of proper transmission factor may be automatically disposed in the optical path in response to a change of the magnification.

The location on the optical path at which the filter 3 is disposed may be anywhere from the semiconductor laser 1 to the recording medium 6. If the filter 3 is disposed in the optical path between the collimater lens 2 and the focusing lens 5, it will be particularly effective because the laser light is parallel and the deterioration of the optical performance resulting from the filter being disposed therein is null. Above all, if the filter is disposed in the optical path between the collimater lens 2 and the scanning means 4 as in the example shown, it will be even better because the optical path is not moved and the size of the filter can therefore be made smaller. However, the filter 3 may also be disposed in the optical path between the lens 5 and the recording medium 6, or in the optical path between the semiconductor laser 1 and the lens 2, or in the optical path between the scanning means 4 and the lens 5.

In any case, by the filter 3 being disposed in the optical path, it becomes possible to minimize the enlargement of the spot size of the laser light and effect the image recording by the semiconductor laser without causing the phenomenon of streaking to affect the image.

Figure 4:
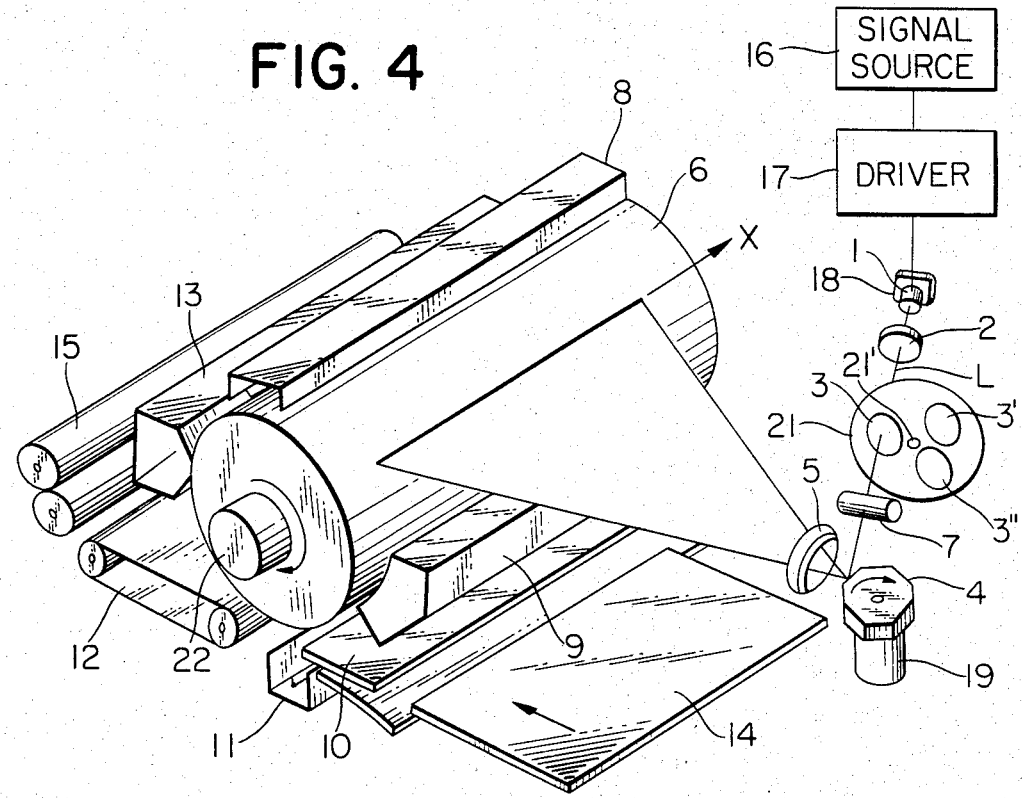
FIG. 4 illustrates another embodiment of the present invention.

FIG. 4 shows a laser beam printer which uses a drum-shaped electrophotographic photosensitive member (hereinafter simply referred to as the drum) using as the recording medium 6 a photoconductor such as ZnO, amorphous Se, amorphous Se-Te, amorphous Si, CdS or OPC and obtains a record through an image transfer type electrophotographic process. In FIG. 4, means functionally similar to those of the FIG. 3 apparatus are given reference numerals similar to those in FIG. 3.

The laser light from the semiconductor laser 1 passes through a filter 3, 3' or 3" and has the difference b between the rising peak value and the steady value thereof decreased. The filters 3, 3' and 3" are for a first, a second and a third magnification mode, respectively, and have different light transmission factors. The filters 3, 3' and 3" are mounted on a turret plate 21 rotatable about a shaft 21'. By rotating the turret plate 21 manually or by a motor or the like, not shown, a filter corresponding to a selected image formation magnification is disposed in the optical path.

The laser light passed through the filter passes through a cylindrical lens 7 and is projected upon a polygonal mirror 4 rotated at a speed corresponding to the selected image formation magnification. The cylindrical lens 7 corrects for the falling of each reflecting surface of the polygonal mirror 4. The laser light incident on the polygonal mirror 4 has its direction of deflection varied with time and scans the drum 6 in the direction of a generating line (the major scanning direction x) at a speed corresponding to the selected image formation magnification. The laser light is focused in the form of a spot on the drum 6 by the lens 5.

The drum 6 is rotatively driven in the direction of the arrow (the mirror scanning direction) at a speed corresponding to the selected image formation magnification by a variable speed motor 22.

As the electrostatic latent image forming process wherein the surface of the rotating drum is charged by a charger 8 and then the charged surface is exposed to the scanning laser light, whereby electrostatic latent images of image patterns corresponding to image signals are successively formed, not only the Carlson process but also a process which uses a photosensitive member comprising a conductive layer, a photoconductive layer and a surface insulating layer, namely, a well-known process wherein the photosensitive member is subjected to primary charge, and then is exposed to laser light while, at the same time, it is subjected DC charge opposite in polarity to the primary charge or AC charge and subsequently the whole surface of the photosensitive member is exposed to light, can be adopted.

The latent image formed on the surface of the drum 6 is developed by a developing device 9, and the developed image is transferred to a transfer medium 14 directed to an image transfer station through a guide 10, by a charger 11. After the image transfer, the transfer medium 14 is separated from the surface of the drum 6 and conveyed to a fixing device 15 by a conveyor belt 12, whereby the image on the transfer medium is fixed and then the transfer medium is discharged out of the apparatus. On the other hand, the surface of the drum 6 after the image transfer is cleaned by a cleaner 13 to remove the residual image therefrom, thus becoming ready for another cycle of image formation.

The developing device 9 supplies the drum 6 with toner charged to the same polarity as the potential of the dark portion of the drum 6, namely, the surface potential of the drum 6 in the area thereof which has not been exposed to the laser light. Accordingly, the toner adheres to the area of the drum 6 which has been exposed to the laser light, namely, the area of light portion potential, and does not adhere to the area of dark portion potential. Use may also be made of a developing device which supplies the drum 6 with toner charged to the polarity opposite to the dark portion potential and causes the toner to adhere to the area of dark portion potential and does not cause the toner to adhere to the area of light portion potential.

Figure 1:
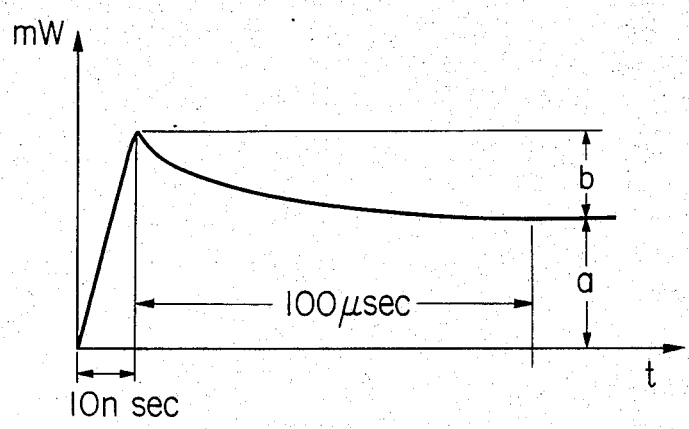
FIG. 1 illustrates the phenomenon of streaking of a semiconductor laser.
Figure 2:
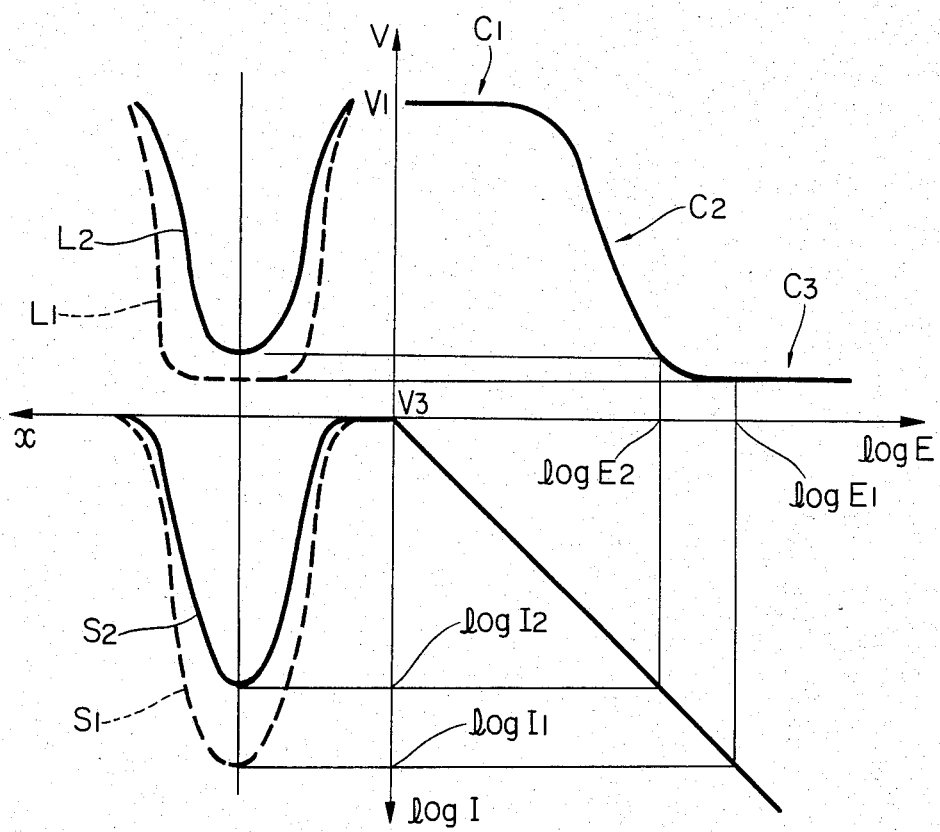
FIG. 2 illustrates the intensity of light, the exposure amount, the latent image potential, the intensity distribution of a beam spot, and the spot latent image potential.

In any case, the output light of steady intensity $I_1$ in which the degree of streaking is small is reduced to intensity $I_2$ by the filter (FIG. 2). Thereupon, the intensity distribution of the beam spot on the photosensitive member 6 becomes as indicated by $S_2$, the exposure amount $E_2$ comes to enter the area $C_2$ of E-V curve, and the latent image becomes as indicated by curve $L_2$. As is apparent from curve $L_2$, the diameter of one spot of the image obtained becomes smaller and the resolving characteristic of the image is improved.

In electrophotography, disturbance of the image occurs in the step of developing the latent image and the step of transferring the developed image and therefore, sharpness of the latent image is particularly required in order to compensate for such disturbance.

Accordingly, it is particularly effective in the electrophotographic process to use the output of the laser light within such a range that the influence of streaking is not conspicuous, to attenuate the light by the filter and to impart an appropriate exposure amount to the photosensitive medium, as in the present invention.

It is to be understood that the difference between the potential $V_1$ of an area $C_1$ and the potential $V_3$ of an area $C_3$ is Vc. It is also to be understood that the intensity of the laser light after passed through the filter during the rising peak is $I_3$ and that the intensity of the laser light after passed through the filter during the steady state is $I_2$. Thus, the filter used should preferably have such a light transmission factor such that the difference $\Delta V$ between the surface potential of the photosensitive member exposed to light of intensity $I_3$ and the surface potential of the photosensitive member exposed to light of intensity $I_2$ is within 15% of Vc. This is because if $\Delta V$ is within 15% of Vc, the density irregularity of the image can be reduced to a practically negligible degree. However, $\Delta V$ may be greater than 15% of Vc. That is, according to the present invention, the influence which the phenomenon of streaking inherent to the semiconductor laser imparts to the image can be reduced and nevertheless, the resolving characteristic can be improved.

Also, according to the present invention, the adjustment range of the output of the semiconductor laser corresponding to the irregularity of the sensitivity of the recording medium becomes wider.

What is claimed is:

1. An image information recording apparatus including:
    a movable electrophotographic photosensitive member;
    means for forming a laser beam modulated in accordance with image information to be recorded, said means including a semiconductor laser for generating said laser beam;
    optical filter means for decreasing the difference between the rising peak intensity value and the steady intensity value of said laser beam emitted by said semiconductor laser;
    optical scanning means for scanning the laser beam relative to said photosensitive member to form an electrostatic latent image corresponding to the image information to be recorded;
    a focusing lens for focusing the laser beam on said photosensitive member; and
    developing means for developing said electrostatic latent image, said optical filter means reducing the rising peak intensity value of the laser beam to $I_3$ and the steady intensity value of the laser beam to $I_2$ corresponding to a steeply sloped area of the E-V (Exposure amount—Potential) curve of the electrophotographic photosensitive member, respectively, and having such a light transmission factor such that $\Delta V$ is within about 15% of Vc, wherein Vc is a difference between potentials of a highland area and of a lowland area of said E-V curve and $\Delta V$ is a difference between surface potentials of the photosensitive member exposed to the laser beams of the intensity $I_3$ and of the intensity $I_2$.

2. The apparatus according to claim 1, wherein said developing means supplies said photosensitive member with toner charged to the same polarity as the dark portion potential of said photosensitive member.

3. The apparatus according to claim 1, further including:
means for keeping the temperature of said semiconductor laser substantially constant.

4. The apparatus according to claim 2, further including:
means for keeping the temperature of said semiconductor laser substantially constant.

5. An image information recording apparatus according to claim 1, wherein the steady intensity value $I_1$ of said laser beam before being reduced by said optical filter means corresponds to the lowland area of the E-V curve.

* * * * *